United States Patent [19]
De Ricci et al.

[11] Patent Number: 5,922,482
[45] Date of Patent: *Jul. 13, 1999

[54] DETECTABLE POLYMERIC PROTECTIVE GLOVES

[75] Inventors: Sophie De Ricci, Colombes; Patricia Phalip, Chalette, both of France

[73] Assignee: Hutchinson, Paris, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/745,688

[22] Filed: Nov. 8, 1996

[30] Foreign Application Priority Data

Nov. 9, 1995 [FR] France ................................... 95 13266

[51] Int. Cl.⁶ ............................... B32B 9/00; A41D 19/00
[52] U.S. Cl. ................................. 428/692; 2/161.6; 2/167; 2/168
[58] Field of Search ...................... 428/692, 689; 2/161.6, 167, 168

[56] References Cited

U.S. PATENT DOCUMENTS

| | | | |
|---|---|---|---|
| 3,634,184 | 1/1972 | Wang | 161/159 |
| 4,918,754 | 4/1990 | Leatherman et al. | 2/16 |
| 5,173,525 | 12/1992 | De Servi et al. | 524/431 |
| 5,181,021 | 1/1993 | Lee et al. | 340/572 |
| 5,305,410 | 4/1994 | Arroyo | 385/109 |
| 5,426,716 | 6/1995 | Arroyo et al. | 385/100 |

FOREIGN PATENT DOCUMENTS

| | | |
|---|---|---|
| 0 447 793 | 9/1991 | European Pat. Off. . |
| 2 078 861 | 11/1971 | France . |
| 9 301 542 | 4/1995 | Netherlands . |
| WO 90/09584 | 8/1990 | WIPO . |
| WO 91/12119 | 8/1991 | WIPO . |

*Primary Examiner*—Christopher Raimund
*Attorney, Agent, or Firm*—Alston & Bird LLP

[57] ABSTRACT

Polymeric protective articles, such as gloves, normally used in manufacturing, conversion or packaging lines, especially in the agri-foodstuffs, pharmaceuticals or food sector are disclosed. The articles contain uniformly distributed throughout, a material having conducting and/or magnetic properties, which is detectable by a metal-particle detector. A process for preparing the said articles is also disclosed.

4 Claims, 3 Drawing Sheets

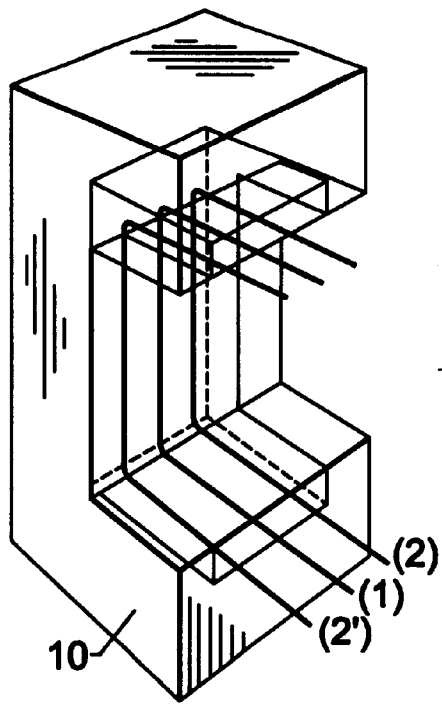
FIG. 1A.
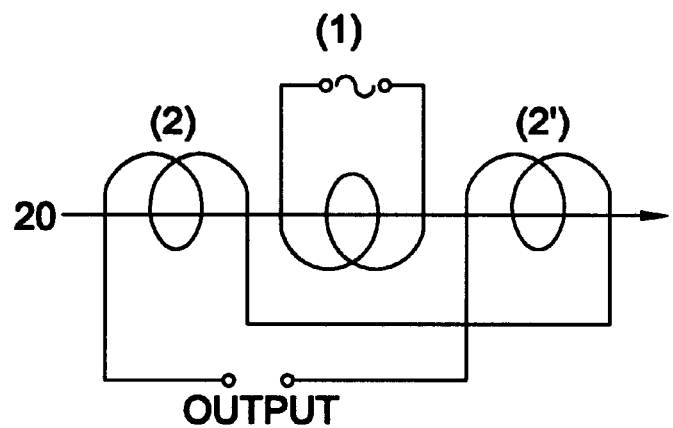
FIG. 1B.
| (1) | 150-200 μm |
| (2) | 50-100 μm |
| (3) | 200 μm |
FIG. 3.

DETECTABLE POLYMERIC PROTECTIVE GLOVES

The present invention related to the detection of very small-size (for example 5×5 mm) polymeric foreign bodies in a manufacturing, conversion or packaging line, especially in the agri-foodstuffs, pharmaceuticals or food sector. By foreign bodies is meant, for example, protective articles used in the said manufacturing or packaging lines, such as gloves. Such foreign bodies must be readily detected; this is because, in particular in the context of the manufacture of prepared foods, operators generally are required to wear sealed gloves for hygiene reasons. Any contamination of the food by a piece of glove must be avoided and monitored. However, it sometimes happens that gloves worn by the operators become torn and that pieces of glove fall into the food being prepared.

Consequently, the aim of the present invention was to modify the polymeric protective articles, normally used in manufacturing or packaging lines, so as to make fragments of them detectable, even if they have dimensions of the order of one mm.

Currently, this problem is solved by the use of articles, and especially of gloves, having a colour different from the objects treated in the manufacturing, conversion or packaging lines. In the case of food for example, the use of white or natural-coloured (flesh-coloured) gloves, which are too easily confused with food, must be prescribed. However, the regulations with regard to plant hygiene require, for the operators, the use of clothing having a light colour, sometimes exclusively a white colour. In addition, visual detection is not entirely reliable.

Although for detecting a tear in gloves, in the medical field (International Application WO 94/02080 in the name of Isis Innovation Limited), it has been proposed to use a dye whose colour is modified when the glove is perforated, such a solution is not suited to problems which arise in the context of the aforementioned industries.

Other detection techniques, such as the incorporation of an aluminium foil, for example in dressings, are also not suited to non-flat elements or to elements having an elastic character, such as gloves.

In the case of polymeric (elastomeric or plastic) protective articles such as protective gloves, it is in fact necessary:

that the entire shape of the protective articles (a glove for example) contain the detectable material, it being possible for an accidental cut in the polymeric article to occur at any point;

that the method of detection be sufficiently sensitive in order to detect small fragments (5×5 mm); and that there be no impairment of the mechanical properties of the polymeric protective article (for example the elasticity of the glove).

Consequently, the aim of the Applicant was to provide polymeric protective articles which meet the practical requirements better than the protective articles of the prior art, especially in that it is actually possible to detect, sensitively and reliably, a small fragment of the said article present, inadvertently, in a manufacturing, conversion or packaging line in the agri-foodstuffs, food or pharmaceuticals sector.

The subject of the invention is polymeric protective articles, such as protective gloves made of elastomer or plastic, which articles are characterized in that they contain, distributed uniformly throughout the said articles, a material having conducting and/or magnetic properties, which is detectable by a metal-particle detector, which material is in the form of at least one uniform layer, based on a powder selected from the group consisting of metal powders and metal-oxide powders, selected from ferrites having a high maximum slope in the hysteresis cycle and a low coercive field.

Advantageously, the said metal powders are preferably selected from barely oxidizable metal powders, such as metal powders of noble metals.

For example, in the case of a Safeline model S35 metal-particle detector, a high maximum slope in the hysteresis cycle is understood to mean, in the sense of the present invention, a slope greater than $10^{-2} m^3 kg^{-1}$, preferably greater than $5 \times 10^{-2} m^3 kg^{-1}$, and low coercive field understood to mean a coercive field of less than $10^5$ A.m$^{-1}$, preferably of about $10^3$ A.m$^{-1}$.

In accordance with the invention, the said powder has a particle size of between 0.1 and 200 µm, preferably between 0.1 and 30 µm.

The said uniform layer is preferably sandwiched between two layers of polymers not containing any detectable material.

As a variant, the said detectable material is in the form of metal fibers (these being meshed, woven and/or braided).

Surprisingly, the protective articles in accordance with the invention contain the detectable material throughout the article, may be detected by means of existing metal-particle detection systems, do not exhibit modifications in their mechanical properties and are stable (stability of the dispersion of the detectable material throughout the polymeric article).

The subject of the present invention is also a process for preparing a polymeric protective article in accordance with the invention, characterized in that it comprises:

(1) incorporating the material having conducting and/or magnetic properties, which is detectable by a metal-particle detector, in a polymeric material;

(2) dissolving the mixture obtained in (1) in a suitable solvent; and (3) forming the article using the methods specific to the rubber and plastics industries, such as injection moulding, extrusion, calendering, coating and dipping.

In accordance with the invention, in the case in which the said material having conducting and/or magnetic properties is in the form of a powder:

step (1) comprises either incorporating the said powder directly into the polymer, when the latter is in solid form, or, when the said polymer is in liquid form, predispersing the powder in an aqueous solution, preferably containing a dispersing agent, followed by adding the polymer in liquid form to the said predispersion.

According to another embodiment of the process according to the invention, step (3) of forming the article is carried out by successively dipping into solutions as obtained in step (2) and into solutions not containing material having conducting and/or magnetic properties.

Such a method makes it possible to obtain, for example, gloves in which the said detectable material is uniformly distributed.

In addition to the foregoing arrangements, the invention furthermore comprises other arrangements which will emerge from the following description which refers to embodiment examples of the present invention, as well as to the appended drawings on which:

FIG. 1 represents a metal-particle detector (FIG. 1A: diagrammatic representation of a detection head composed of three equidistant loops (1, 2, 2'); FIG. 1B: operating diagram);

FIG. 3 represents a sectional view of a multilayer article according to the invention;

It should be properly understood, however, that these examples are given solely by way of illustrating the subject of the invention, and that they in no way constitute any limitation.

EXAMPLE 1

Preparation of a Glove made of Detectable Elastomer in Accordance with the Invention, comprising as Detectable Material a Powder of Metal Oxides Latex Formulation Layer providing the Mechanical Properties

| Latex bath No. 1: | |
|---|---|
| Butofan LNW6C (BASF nitrile latex) | 100 g |
| Potassium hydroxide | 0.5 g |
| Nonylphenol | 2 g |
| Zinc oxide | 2 g |
| Carbamate-type accelerator | 0.8 g |
| Sulphur | 1 g |
| Titanium oxide | 1 g |
| 2,2'-methylenebis(6-tert-butyl-p-cresol) | 1 g |

Preparation of the Ferrite Dispersion for the Latex Bath No. 2

| Bayferrox 318M (Bayer) | 100 g |
|---|---|
| Ketjenlube 522 (Akzo Nobel) | 3.35 g |
| Demineralized water | 100 g |

Composition of the Layer Containing the Ferrites

| Bath No. 2: | |
|---|---|
| Ferrite dispersion (Bayferrox 318M (Bayer)) | 100 g |
| 16% aqueous solution of Mowiol 26/88 | 10 g |
| Nitrile latex (38%) | 215 g |
| Composition of the internal layer: | |
| Bath No. 3: | |
| Butofan (38% BASF nitrile latex) | 100 g |
| Potassium hydroxide | 0.5 g |
| Nonylphenol | 2 g |
| Zinc oxide | 2 g |
| Carbamate-type accelerator | 0.8 g |
| Sulphur | 1 g |
| 2,2'-Methylenebis(6-tert-butylcresol) | 1 g |
| Titanium oxide | 5 g |
| Sodium polyacrylate | 0.2 g |

Dipping Protocol conditioning the ceramic formers at 70° C.;

dipping in a bath of coagulant (35% aqueous solution of calcium nitrate);

drying the coagulant for 5' at 70° C.;

dipping the former into the latex bath No. 1;

drying the latex for 5';

dipping in the latex bath No. 2;

drying for 5';

dipping into the latex bath No. 3;

spraying the floc (spraying of ground or chopped fibres);

washing by immersion in water for 1 hour at 40° C.;

drying for 1 hour at from 70° C. to 90° C.;

vulcanizing for 30 min at from 100 to 125° C.;

demoulding the glove.

The operations of dipping into the latex bath No. 2, of drying and of dipping into the latex bath No. 3 may be repeated several times, so as to obtain articles containing several layers of detectable material, these being sandwiched between layers of rubber not containing any detectable material.

In this case, a multilayer article as illustrated in FIG. 3 is obtained, in which the layer (1) (external layer) is a layer of elastomer having no ferrite, with a thickness of between 150 and 200 μm, the layer (2) consists of elastomer in which a ferrite is uniformly distributed, with a thickness of between 50 and 100 μm, and the layer (3) (internal layer) is a layer if elastomer with a thickness of approximately 200 μm, combined with a floc in order to make it adhesive (comfort, especially in the case of gloves).

Figure 2:
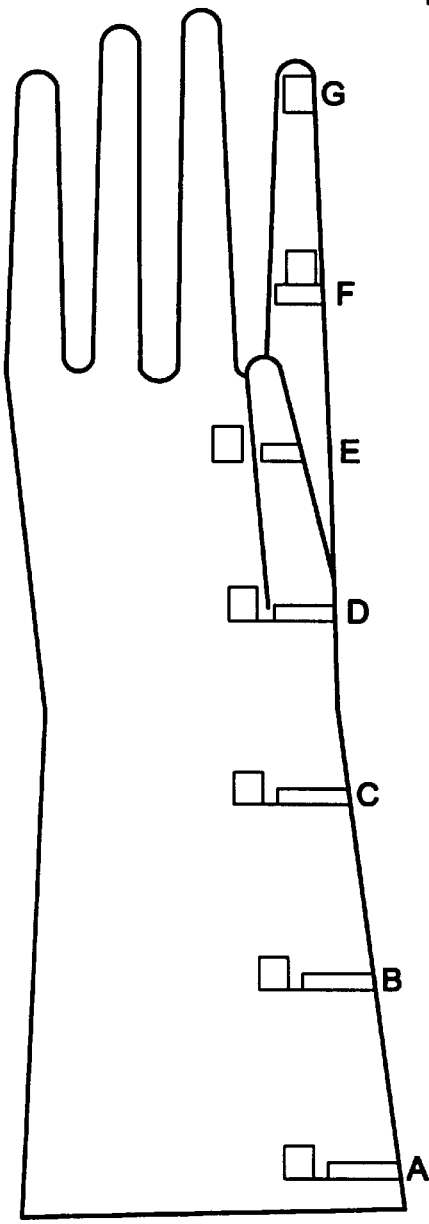
FIG. 2 is a representation of the distribution of a metal-oxide powder in a glove according to Example 1 and the area detected as a function of the thickness of the layer containing the detectable material.

Detection studies using a Safeline® S35 detector (see FIG. 1) were carried out on pieces of gloves of different areas. The results are illustrated in FIG. 2 and show that the area detected depends on the thickness of the ferrite layer.

For example, for a thickness of the ferrite layer of 150 μm, this apparatus enables as area of 1.7×0.5, i.e. 0.85 cm², to be detected.

EXAMPLE 2

Embodiment Example of a Glove Starting form a Dissolved Elastomer.

Other methods of preparing the said detectable articles may be envisaged; in fact, depending on the applications and the methods employed to obtain the end-product, the rubber may be, other than in the latex form (see Example 1), in tow other different forms:

dry rubber: this is the most common form; the powder of detectable material may in this particular case be introduced with other ingredients, such as fillers, plasticizers and vulcanizing agents, in a conventional mixer; in this case, the article is formed by one of the following methods: extrusion, calendering, injection moulding;

solution: the rubber is dissolved in a suitable solvent. The powder of detectable material may be introduced in a dry-rubber mixer or in a dissolving mixer. These solutions are used on gum coaters (coating of fabrics), deposited using a gun, like paints, or by dipping.

The embodiment example starting from an elastomer solution comprises:

Preparation of a Composition for the Layer
Providing the Mechanical Properties

Bath 1:

| Kraton G1652[1] | 15 g |
|---|---|
| Cyclohexane | 85 g |

[1] Shell elastomer

Preparation of a Composition for the Layer
Containing the Ferrites:

Bath 2:

| Rayferrox 318M ® | 53 g |
|---|---|
| Kraton G 56A41[2] | 36 g |
| Cyclohexane | 190 g |

[2] multibase formulation.

Internal Finishing Layer

Bath 3:

| Kraton D 1102[3] | 10 g |
|---|---|
| cyclohexane | 90 g |

[3] Shell elastomer.

Dipping Protocol preheating the former for 3 min at 70° C.

Bath No.. 1

1st layer: slow entry and exit, without dwell distributing, by rotating for 10 min drying for 2 min at 70° C.

2nd layer: idem distributing, by rotating for 11 min drying for 10 min at 70° C.

Bath No. 2

1st layer:

moderate entry and slow exit, without dwell distributing, for 2 minutes ventilating, for 5 minutes 2nd layer:

moderate entry and slow exit, without dwell distributing, for 2 minutes 40 ventilating, for 5 minutes 3rd layer:

moderate entry and slow exit, without dwell distributing, for 3 minutes 20 ventilating, for 5 minutes 4th layer:

moderate entry and slow exit, without dwell distributing, for 4 minutes ventilating, for 5 minutes Bath No. 3 (finishing layer)

moderate entry and slow exit, without dwell distributing, for 4 minutes ventilating, for 5 minutes.

EXAMPLE 3

Detection of Foreign Bodies in a Packaging,
Conversion or Manufacturing Line

Small fragments (0.85 cm$^2$) for polymeric articles containing a detectable material, such as those described in Example 1, may especially be detected using a metal-particle detector illustrated in FIG. 1. Such a detector comprises a detection head, composed of three equidistant loops (1,2,2') inserted into an insulating support (10). The central loop (1) is connected to an oscillator and emits an electromagnetic field inducing a potential difference in the two outer loops. When the product to be checked passes along the direction of the common axis (20) of the three loops, the least presence of metal causes a slight potential difference. This is not cancelled out by the automatic balancing system but is amplified and converted into pulses in order to actuate a relay or an ejection system.

Figure 4:
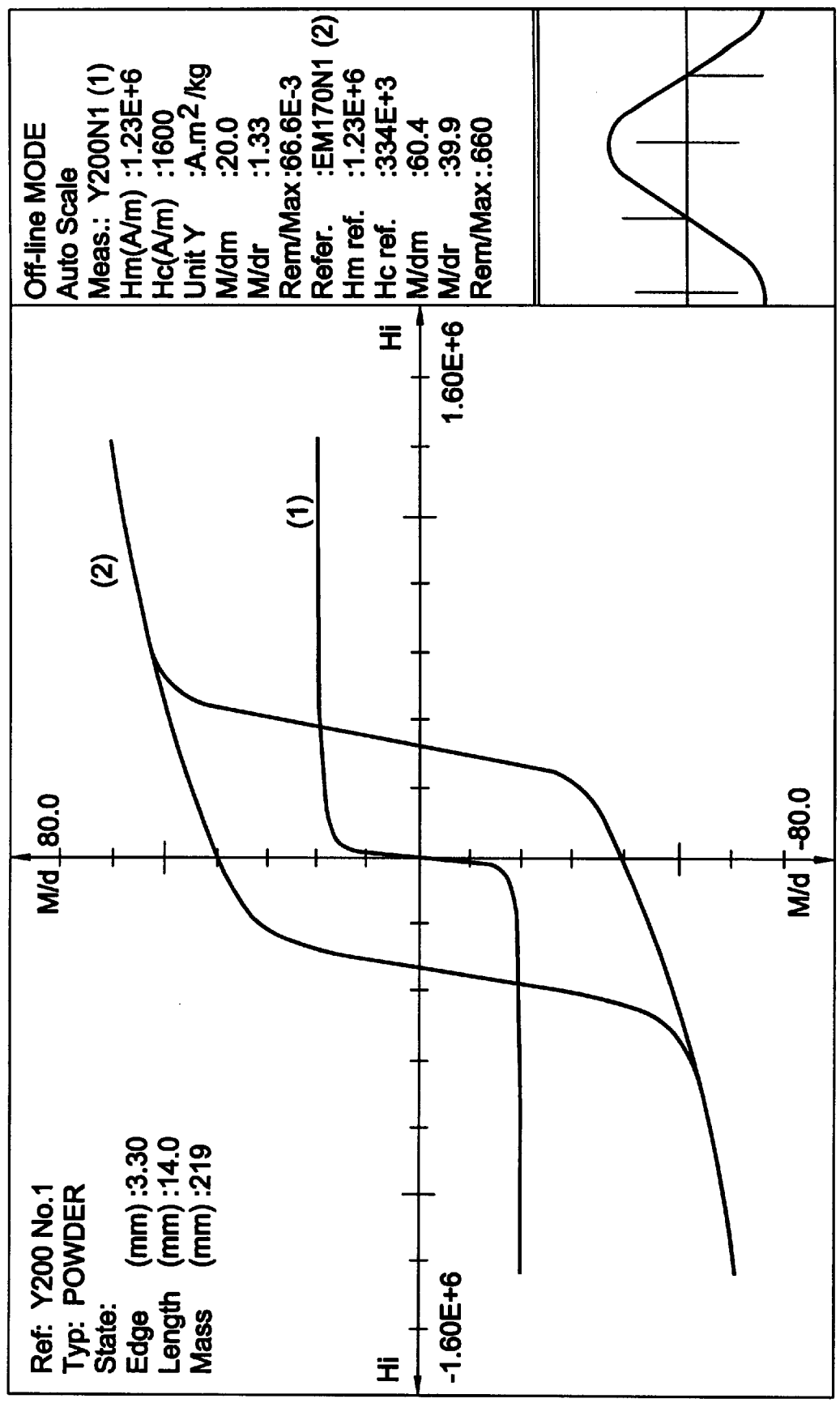
FIG. 4 illustrates the magnetic properties of an yttrium ferrite [Y200, curve (1) ] and of a strontium ferrite [HM1700, curve (2) ].

Depending on the detectable material used, the metal-particle detector reacts differently; in the case of ferrites, Tables I and II below and FIG. 4 summarize the characteristics thereof and the quantities which can be detected by this particle detector.

TABLE I

| | Maximum slope in the hysterasis cycle ($m^3 \cdot kg^{-1}$) | Coercive field[1] ($A \cdot m^{-1}$) | Detectable quantity[2] (g) |
|---|---|---|---|
| Yeerium ferrite Y200 | $6.6 \times 10^{-2}$ | $1.6 \times 10^3$ | 0.012 |
| Iron ferrite, $Fe_3O_4$ | $9 \times 10^{-2}$ | $8.46 \times 10^3$ | 0.0094 |
| Strontium ferrite, HM170 | $0.99 \times 10^{-2}$ | $3.34 \times 10^5$ | 0.069 |

[1] measurements made on an M2000 Hysteresis meter (see also Figure 4)
[2] determined using a SAFELINE ® metal-particle detector, model S35.

TABLE II

Quantity of powder or metal detected by the Safeline ® apparatus, model S35

| Powder | Metal metallic element | Sensitivity:199 with no phase shift Mass detected: (g) | Sensitivity:120 Phase shift:3500 Mass detected: (g) |
|---|---|---|---|
| Ferrites | | | |
| Yeerium ferrite | | | |
| Y200 | Fe, Y | 0.036 | 0.0116 |
| Y212 | Fe, Y, Ca | 0.044 | 0.0092 |
| Y216 | Fe, Y, Ca | 0.046 | 0.0086 |
| Y220 | Fe, Y, Ca | 0.046 | 0.0078 |
| Zn ferrite | | | |
| A500 | Fe, Zn | 0.052 | 0.0072 |
| Strontium ferrite HM 170 | St, Ba | 0.2 | 0.069 |
| Natural iron ferrite, $Fe_3O_4$ | Fe | — | 0.015 |
| Bayferrox 310M | Fe, Fc | — | 0.0094 |
| Calcium ferrite, Ferrinox FC 71 (S.N.C.Z.) | Fe, Ca | — | 0.135 |
| Cobalt ferrite, TODA | Fe, Co | — | 0.0231 |
| Oxides Iron oxide, $Fe_2O_3$ | Fc | — | 0.044 |
| OXYFERNOIR | Fe | — | 0.0130 |

TABLE II-continued

Quantity of powder or metal detected
by the Safeline ® apparatus, model S35

| Powder | Metal metallic element | Sensitivity:199 with no phase shift Mass detected: (g) | Sensitivity:120 Phase shift:3500 Mass detected: (g) |
|---|---|---|---|
| (Ferro) Iron carbonyl | Fe | 0.086 | 0.0132 |
| Metals Aluminium | | | |
| Al. foil | Al | 0.003 | — |
| A.2002 | Al | >5 | >5 |
| Al. 01GA15v | Al | 0.473 | >0.473 |
| Zinc | Zn | 2.76 | >2.76 |

In particular:

Table I illustrates the advantage of yttrium ferrite for detecting small quantities of ferrite, with a detector of the SAFELINE® type, model S35 and shows the advantage of ferrites having a high maximum slope in the hysteresis cycle and low coercive field;

FIG. 4 illustrates the results obtained in Table I (magnetic properties); it comprises, as abscissae, the induced field (Hi) and, as ordinates, the magnetization (M/d); in this figure, Hm corresponds to the excitation field corresponding to saturation of the material; Hc corresponds to the coercive field, M/dm to the saturation magnetization and M/dr to the remanent maagnetization;

Table II shows especially that the Safeline® S35 metal-particle detection apparatus makes it possible to detect, at the least-sensitive point of the apparatus, especially very small quantities of ferrites (Zn, Fe, Y), allowing detection of fragments containing very small quantities of the said ferrites.

As has emerged from the foregoing, the invention is in no way limited to those of its methods of implementation, of realization and of application which have just been described in a more explicit manner; on the contrary, it embraces all variants thereof which may come to mind to the material expert without departing either from the context or the scope of the present invention.

We claim:

1. A polymeric protective glove comprising a flexible sheet formed of at least one layer which comprises a polymer selected from the group consisting of elastomers and plastics, and containing ferrites distributed uniformly throughout the layer, the ferrites having maximum slope in the hysteresis cycle $>10^{-2}$ $m^3 \cdot kg^{-1}$ and a coercive field $<10^5$ $A.m^{-1}$.

2. Polymeric protective glove according to claim 1, wherein said maximum slope in the hysteresis cycle is greater than $5 \times 10^{-2}$ $m^3 \cdot kg^{-1}$ and said coercive field is about $10^3 A.m^{-1}$.

3. A polymeric protective glove according to claim 1 wherein the ferrites uniformly distributed in said layer have a particle size of between 0.1 and 200 $\mu$m.

4. A polymeric protective glove having a hand portion and finger portions and formed of a flexible sheet having a plurality of polymer layers, said sheet including at least one interior layer which comprises a polymer selected from the group consisting of elastomers and plastics and containing ferrites distributed uniformly throughout the layer, and outer polymer layers which do not contain ferrites positioned on opposite sides of said at least one ferrite-containing polymer layer.

* * * * *